United States Patent
Hwang et al.

(10) Patent No.: US 11,980,873 B2
(45) Date of Patent: May 14, 2024

(54) METHOD FOR PRODUCING HOLLOW ACTIVATED CARBON NANOFIBER FOR ACTIVATING PEROXYMONOSULFATE, CATALYST FOR PURIFYING WATER, AND METHOD FOR PURIFYING WATER

(71) Applicant: UIF (University Industry Foundation), Yonsei University, Seoul (KR)

(72) Inventors: Jung Ho Hwang, Seoul (KR); Sang Mo Kang, Gyeonggido (KR); Hyeong Rae Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 294 days.

(21) Appl. No.: 17/171,945

(22) Filed: Feb. 9, 2021

(65) Prior Publication Data
US 2021/0245142 A1   Aug. 12, 2021

(30) Foreign Application Priority Data
Feb. 10, 2020   (KR) .................. 10-2020-0015711

(51) Int. Cl.
*B01J 23/889* (2006.01)
*B01J 21/18* (2006.01)
(Continued)

(52) U.S. Cl.
CPC .......... *B01J 23/8892* (2013.01); *B01J 21/18* (2013.01); *B01J 35/58* (2024.01); *B01J 37/084* (2013.01);
(Continued)

(58) Field of Classification Search
CPC . B01J 21/00; B01J 21/18; B01J 21/185; B01J 23/8892; B01J 23/00; B01J 23/34;
(Continued)

(56) References Cited

FOREIGN PATENT DOCUMENTS

| KR | 100952945 B1 | 4/2010 |
| KR | 101947308 B1 * | 2/2019 |
| KR | 101947308 B1 | 2/2019 |

OTHER PUBLICATIONS

Li, M.C., Tong, S., Lin, J.T., Lin, K.Y.A. and Lin, Y.F., 2020. Electrospun Co3O4 nanofiber as an efficient heterogeneous catalyst for activating peroxymonosulfate in water. Journal of the Taiwan Institute of Chemical Engineers, 106, pp. 110-117 (Year: 2019).*

(Continued)

*Primary Examiner* — Magali P Slawski
*Assistant Examiner* — Bernadette Karen McGann
(74) *Attorney, Agent, or Firm* — TAROLLI, SUNDHEIM, COVELL & TUMMINO L.L.P.

(57) ABSTRACT

The present invention relates to a method for producing hollow activated carbon nanofibers for activating peroxymonosulfate used in water purification; a catalyst for water purification comprising the hollow active carbon nanofibers produced by the method; and a method for purifying contaminated water using the catalyst. The production method of the present invention can easily produce hollow activated carbon nanofibers capable of rapidly purifying contaminated water by highly efficiently activating peroxymonosulfate used for water purification.

5 Claims, 8 Drawing Sheets (51) Int. Cl.
    *B01J 35/58* (2024.01)
    *B01J 37/08* (2006.01)
    *B01J 37/34* (2006.01)
    *C02F 1/72* (2023.01)
    *C02F 101/30* (2006.01)
    *D01D 5/00* (2006.01)
    *D01D 10/02* (2006.01)
    *D01F 9/24* (2006.01)

(52) U.S. Cl.
    CPC ............ *B01J 37/086* (2013.01); *B01J 37/342* (2013.01); *C02F 1/725* (2013.01); *D01D 5/003* (2013.01); *D01D 10/02* (2013.01); *D01F 9/24* (2013.01); *C02F 2101/308* (2013.01); *C02F 2305/08* (2013.01)

(58) Field of Classification Search
    CPC ....... B01J 23/75; C02F 1/725; C02F 2305/08; C02F 1/283
    See application file for complete search history.

(56) References Cited

OTHER PUBLICATIONS

Liu, G., Lv, H., Sun, H. and Zhou, X., 2018. Fabrication of tubelike Co3O4 with superior peroxidase-like activity and activation of PMS by a facile electrospinning technique. Industrial & Engineering Chemistry Research, 57(6), pp. 2396-2403 (Year: 2018).*

Yao, Y., Cai, Y., Wu, G., Wei, F., Li, X., Chen, H. and Wang, S., 2015. Sulfate radicals induced from peroxymonosulfate by cobalt manganese oxides (CoxMn3—xO4) for Fenton-like reaction in water. Journal of Hazardous Materials, 296, pp. 128-137 (Year: 2015).*

Machine generated translation of KR101947308B1 (Year: 2019).*

Lee, H., Lee, H.J., Jeong, J., Lee, J., Park, N.B. and Lee, C., 2015. Activation of persulfates by carbon nanotubes: oxidation of organic compounds by nonradical mechanism. Chemical Engineering Journal, 266, pp. 28-33. (Year: 2015).*

Yunjin Yao et al., "Sulfate radicals induced from peroxymonosulfate by cobalt manganese oxides for Fenton-Like reaction in water", Journal of Hazardous Materials, 296, pp. 128-137(Apr. 8, 2015).

Cho, "Cobalt/peroxymonosulfate system" Hanyang University, Graduate School, Chemical Engineering, Theses (Master) No English Translation Available.

Li, et al. "Electrospun Co3O4 nanofiber as an efficient heterogeneous catalyst for activating peroxymonosulfate in water", Journal of the Taiwan Institute of Chemical Engineers, Nov. 19, 2019.

K-Y. Andrew Lin, D-Y. Lin, Y-C. Lu, J-T. Lin, Y-F. Lin, Electrospun Nanofiber of Cobalt Titanate Perovskite as an Enhanced Heterogeneous Catalyst for Activating Peroxymonosulfate in Water, Chemical Engineering Science (2017), doi: http://dx.doi.org/10.1016/j.ces.2017.05.013.

* cited by examiner

METHOD FOR PRODUCING HOLLOW ACTIVATED CARBON NANOFIBER FOR ACTIVATING PEROXYMONOSULFATE, CATALYST FOR PURIFYING WATER, AND METHOD FOR PURIFYING WATER

CROSS-REFERENCE TO RELATED APPLICATION

The present invention claims priority under 35 U.S.C. § 119 to Korean Patent Application No. 10-2020-0015711 filed on Feb. 10, 2020 the entire content of which is incorporated herein by reference.

BACKGROUND

Field of the Invention

The present invention relates to a method for producing hollow activated carbon nanofibers for activating peroxymonosulfate used in water purification, a catalyst for water purification comprising nanofibers produced by the production method, and a water purification method using the catalyst.

Discussion of Related Art

When contaminants are introduced into water intake sources in rivers, lakes, streams, and water and sewage to cause contaminated water, it is possible to generate not only enormous property damage but also life damage. With the proliferation of the recognition of environmental pollution problems that have become severe by the day, many efforts have been made to solve contaminated water in rivers, lakes, streams, and water and sewage.

In particular, sulfate radical-based advanced oxidation processes (SR-AOPs), which have been developed in recent years, are water purification techniques capable of rapidly decomposing organic pollutants in water by readily decomposing peroxymonosulfate (PMS) in water to produce reactive oxygen species (ROS) having strong oxidizing power such as sulfate radicals ($SO_4^-$). Traditional peroxymonosulfate activation techniques are known to use mainly metal, heating, UV light, basic conditions, organic compounds, etc.

However, the conventionally known advanced oxidation technique has disadvantages such as limited activity in the pH range, excessive cost consumption, generation of a large amount of sludge, and the like, which makes it difficult to apply in situ.

Meanwhile, a cobalt-based system such as cobalt/peroxymonosulfate system has been known as a contaminant purification technique (A study of treatment of TPH contaminated soil using a cobalt/peroxymonosulfate system, Jung Hwan CHO, Hanyang University, 2009. 02.), but a peroxymonosulfate activation technique using a cobalt-based heterogeneous catalyst has a problem that cobalt ions as a reaction product are dissolved in water to cause secondary contamination.

SUMMARY OF THE INVENTION

One object of the present invention is to provide a method for producing hollow activated carbon nanofibers for activating peroxymonosulfates.

Another object of the present invention is to provide a catalyst for water purification comprising hollow activated carbon nanofibers (HACNF) for activating peroxymonosulfate produced according to the above method.

Another object of the present invention is to provide a method for purifying contaminated water using peroxymonosulfate and the hollow activated carbon nanofibers.

In order to achieve the above object, according to one aspect of the present invention, there is provided a method for producing hollow activated carbon nanofibers for activating peroxymonosulfate (PMS), comprising: electrospinning two different materials in a concentric cross-section such that a material comprising at least one of manganese acetate and cobalt acetate and polymethyl methacrylate (PMMA) is disposed on the inside and a material comprising peroxyacetyl nitrate (PAN) is disposed on the outside; performing a first thermal treatment on the structure formed by the electrospinning until a first predetermined temperature in an air atmosphere; performing a second thermal treatment on the first thermally treated structure until a second predetermined temperature in a nitrogen atmosphere; and activating the second thermally treated structure by applying a predetermined gas or water vapor.

In one embodiment, in the first thermal treatment step, the structure formed by the electrospinning may be heated so that the temperature of the structure is raised at a rate of 1° C./min.

In another embodiment, the first predetermined temperature may be 250° C.

In another embodiment, in the second thermal treatment step, the first thermally treated structure may be heated so that the temperature of the first thermally treated structure is raised at a rate of 3° C./min.

In another embodiment, the second predetermined temperature may be 900° C.

In another embodiment, the predetermined gas applied in the activating step may be carbon dioxide.

In another embodiment, the peroxymonosulfate may be $2KHSO_5 \cdot KHSO \cdot K_2SO_4$.

According to another aspect of the present invention, there is provided a catalyst for purifying water, comprising hollow activated carbon nanofibers for activating peroxymonosulfate, wherein the hollow activated carbon nanofibers are formed of a carbon material body formed into a tubular shape in which a hollow is formed on the inside, and a plurality of fine pores are formed in the body, $Co_xMn_{3-x}O_4$ is distributed in at least one of the hollow and the fine pores, and x in $Co_xMn_{3-x}O_4$ is 0 to 3.

In one embodiment, in the catalyst for water purification, the hollow activated carbon nanofibers for activating peroxymonosulfate may be produced according to the production method described above.

In another embodiment, in the catalyst for water purification, x may be 2.

In another embodiment, the catalyst for water purification may further comprise peroxymonosulfate.

In another embodiment, the peroxymonosulfate comprised in the catalyst for water purification may be $2KH_5O_5 \cdot KHSO \cdot K_2SO_4$.

Further, according to another aspect of the present invention, there is provided a method for purifying contaminated water, comprising adding the catalyst for water purification to pollution water.

The production method of the present invention can easily produce hollow activated carbon nanofibers capable of rapidly purifying contaminated water by highly efficiently activating peroxymonosulfate used for water purification.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The specific structural and functional descriptions presented in the embodiments of the present invention are merely illustrative for the purpose of describing the embodiments according to the inventive concept, and the embodiments can be implemented in various forms. It is also to be understood that the present invention is not to be construed as limited to the embodiments set forth herein, but is to cover all modifications, equivalents, or alternatives falling within the spirit and scope of this invention.

The present invention will now be described in detail with reference to the accompanying drawings.

Example 1: Production of Hollow Activated Carbon Nanofibers

Figure 1:
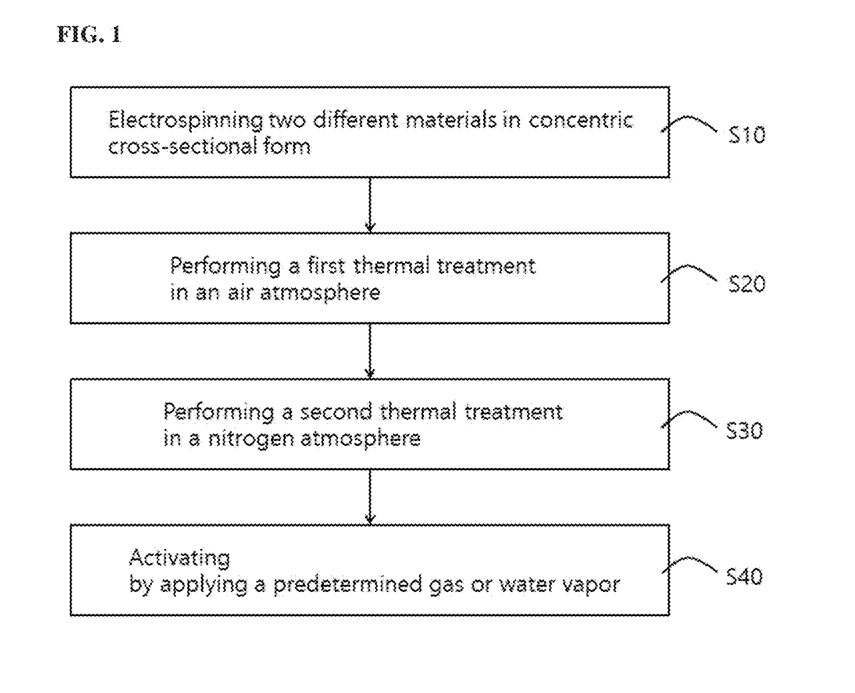
FIG. 1 is a block diagram of a method of producing hollow activated carbon nanofibers according to the present invention.

FIG. 1 shows a block diagram of a method of producing hollow activated carbon nanofibers according to the present invention.

Hollow activated carbon nanofibers are produced by electrospinning two different materials in the form of concentric sections using coaxial electrospinning.

The method for producing hollow activated carbon nanofibers for activating peroxymonosulfate according to the present invention comprises the steps of: (S10) electrospinning two different materials in a concentric cross-section such that a material comprising at least one of manganese acetate and cobalt acetate and polymethyl methacrylate (PMMA) is disposed on the inside and a material comprising peroxyacetyl nitrate (PAN) is disposed on the outside; (S20) performing a first thermal treatment on the structure formed by the electrospinning until a first predetermined temperature in an air atmosphere; (S30) performing a second thermal treatment on the first thermally treated structure until a second predetermined temperature in a nitrogen atmosphere; and finally, (S40) activating the second thermally treated structure by applying a predetermined gas or water vapor. In coaxial electrospinning, two different materials, which are located in a concentric cross-section, are each made of a different material. The material used in the catalyst may be manganese acetate, cobalt acetate or manganese acetate and cobalt acetate. In addition, a first polymer may comprise polymethyl methacrylate (PMMA), a second polymer may comprise peroxyacetyl nitrate (PAN), and the first polymer has a lower melting point than the second polymer. This is to form the hollow shape of the hollow activated carbon nanofibers, and to evenly distribute the material serving as a catalyst for activating peroxymonosulfate on the inner peripheral surface of hollow activated carbon nanofibers, details will be described below.

In the first thermal treatment step (S20), the structure formed by the electrospinning is heated so that the temperature of the structure is raised at a rate of 1° C./min, wherein the temperature to be thermally treated may be about 250° C. The air atmosphere may be any condition in which oxygen is contained.

Further, in the step of performing the second thermal treatment (S30), the first thermally treated structure may be heated so that the temperature thereof is raised at a rate of 3° C./min, and the thermal treatment temperature may be set to about 900° C. The nitrogen atmosphere may be a condition where oxygen is removed and under which thermal treatment is performed.

When the thermal treatment is carried out at a rapid rate, a problem may occur in the hollow activated carbon nanofibers, therefore, production can be completed with no problems and with stability through thermal treatment in which temperature is raised at a constant rate.

Finally, it is preferable that the predetermined gas used in the activation step (S40) is carbon dioxide. In the second thermal treatment (S30), although a plurality of pores are formed in the surface of the hollow activated carbon nanofibers, the gas is supplied in the activation step (S40) to form more pores conducive to activation of the PMS, whereby molecules of the gas react with the hollow active carbon nanofibers to form a plurality of pores. At this time, when carbon dioxide is supplied as the gas to be supplied, the molecules of carbon dioxide are very fine, so that micropores can be formed better.

Figure 2:
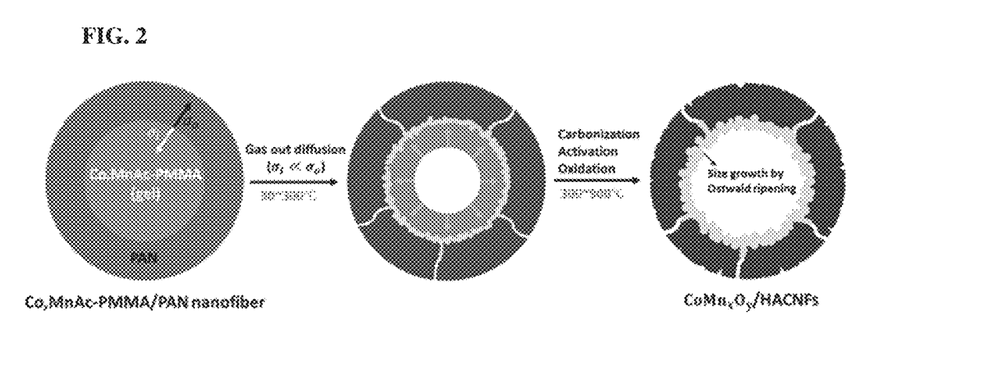
FIG. 2 shows a process for forming hollow activated carbon nanofibers according to the present invention.

FIG. 2 illustrates the formation of hollow activated carbon nanofibers according to the present invention.

When hollow activated carbon nanofibers made of different materials on the inner and outer sides of the cross section are thermally treated, the central portion forms a hollow shape like a tube, and many pores are generated in the inner and outer peripheral surfaces of the nanofibers. Further, oxide catalyst particles (manganese oxide, cobalt oxide, and cobalt manganese oxide), which are one of the first polymers provided inside the hollow activated carbon nanofiber, are evenly distributed.

Therefore, it is possible to have a higher specific surface area than existing nanofibers, and the metal oxide particles can be evenly distributed on the support which is a nanofiber having a higher specific surface area, and thus it is possible to exhibit higher performance than existing metal oxide catalysts.

When looking at the cross section of a fiber made through coaxial electrospinning, the first polymer and the second polymer are positioned in the form of concentric cross sections.

The first polymer located inside the concentric circle shown in cross section is provided with PMMA and DMF as polymer solutions, manganese acetate, cobalt acetate as catalysts, or manganese acetate and cobalt acetate as catalysts. A polymer solution (PAN), which is the second polymer, is positioned outside the first polymer as a polymer solution (PAN) surrounding the first polymer. In this case, the solution used for the first polymer is polymethyl methacrylate (PMMA) and the solution for the second polymer is peroxyacetyl nitrate (PAN).

When the hollow fiber, which has been electro-spun and different polymers are located inside and outside, is subjected to thermal treatment in an air atmosphere at a temperature of about 250° C., the first polymer has a lower melting point than the second polymer, so that PMMA, which is one of the first polymers located inside the cross section, decomposes and disappears, and manganese acetate is oxidized to manganese oxide. The use of cobalt acetate instead of manganese acetate results in oxidation to cobalt oxide. When manganese acetate and cobalt acetate are used simultaneously, a cobalt-manganese composite oxide ($Co_xMn_{3-x}O_4$ (x=0 to 3)) is formed according to the ratio of manganese acetate and cobalt acetate. For example, when cobalt acetate and manganese acetate are used in a ratio of 1:2, $CoMn_2O_4$ is formed. Since PMMA is contained in the first polymer, when PMMA is decomposed and disappears by thermal treatment, catalyst particles such as manganese oxide, cobalt oxide, or cobalt-manganese composite oxide can be evenly distributed and attached to the inner peripheral surface of the hollow fiber.

In PAN, which is the second polymer located on the outside, both nitrogen and oxygen components are removed, and only a carbon component is left, resulting in a tubular hollow fiber. Therefore, the metal oxide particles are evenly distributed in the inner portion of the hollow fiber where the first polymer is located, thereby forming a structure suitable for catalytic oxidation. That is, since a large number of pores are formed inside and outside the PAN in the process of removing the inner PMMA and leaving the outer PAN, the specific surface area is increased to become the optimum hollow activated carbon nanofibers for PMS activation.

The hollow activated carbon nanofibers are then thermally treated at 900° C. in a nitrogen atmosphere. A plurality of pores are formed in the surface of the hollow activated carbon nanofibers in this process. At this time, however, the supply of carbon dioxide or water vapor forms more pores in the surface of the tube-shaped structure to improve the reactivity with PMS.

That is, the surface of the hollow activated carbon nanofibers is thermally treated to form pores to some extent, but different kinds of gases such as carbon dioxide and water vapor are supplied in the step of thermal treatment so that more pores can be formed for activation of hollow activated carbon nanofibers. Depending on the type of gas supplied, particles of different sizes form many pores of different size due to reactions and collisions with the surface of the hollow activated carbon nanofibers.

Meanwhile, when carbon dioxide is supplied during gas supply, the particles of carbon dioxide are relatively very fine, so that it is very advantageous for forming micropores of a fine size, which are advantageous for adsorption of volatile organic compounds. Thus, hollow activated carbon nanofibers formed with pores of various sizes and pores of fine sizes can maintain reactivity regardless of the concentration of PMS.

In other words, the hollow activated carbon nanofibers are formed of a carbon material body formed into a tubular shape in which a hollow is formed on the inside, and a plurality of fine pores are formed in the body. Also, at least one metal oxide of manganese oxide, cobalt oxide and cobalt-manganese composite oxide is distributed in the hollow and fine pores.

Figure 3:
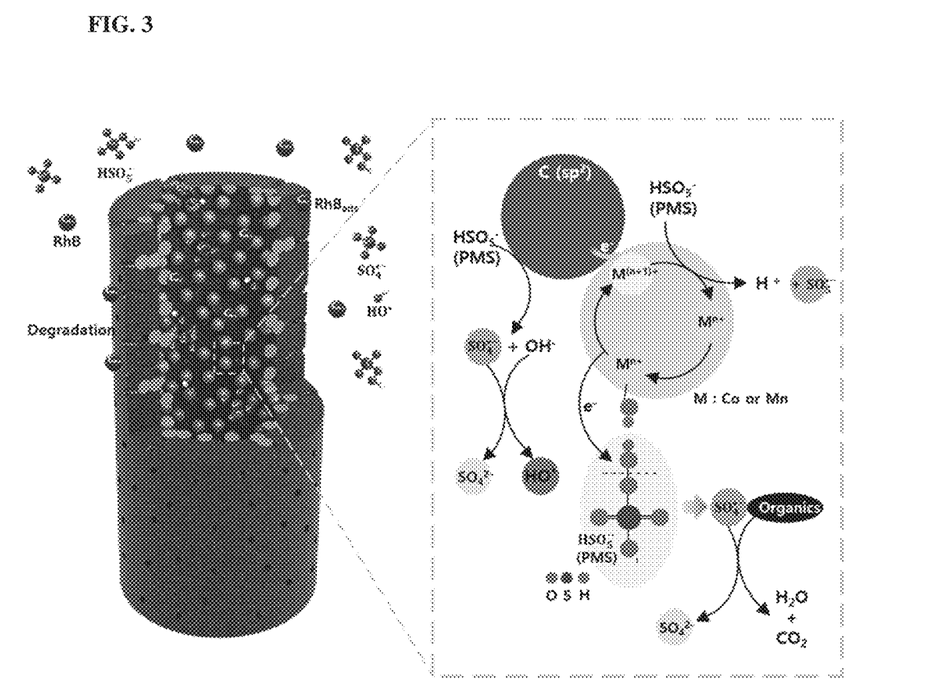
FIG. 3 shows the mechanism of PMS activation of hollow activated carbon nanofibers according to the present invention.

FIG. 3 shows the mechanism of PMS activation of hollow activated carbon nanofibers according to the present invention.

When a filter is made of the hollow activated carbon nanofibers that have been produced and used, PMS can be effectively activated in an aqueous solution to remove contaminants such as organic matter in the activated PMS aqueous solution.

When the hollow activated carbon nanofibers used are recovered and heated to a temperature of about 100-200° C., the compounds adsorbed in the pores 12 are separated, and the catalyzed oxidant is reduced. Thus, it may be reused several times or repeatedly, and a selective reduction method may be applied depending on circumstances.

Meanwhile, hollow activated carbon nanofibers can be used in combination with PMS as a catalyst for water purification.

Example 2: Measurement of PMS Activation Performance 2-1: Experimental Method

In order to compare of PMS activation performance and organic material removal performance with existing materials, the hollow activated carbon nanofibers of the present invention, $Co_xMn_{3-x}O_4$—HACNF (x=0 to 3), and the electrospun or thermally treated activated carbon nanofiber (ACNF), $CO_3O_4$, and $Mn_3O_4$ (Sigma-Aldrich) were produced as test samples and compared.

The tests were carried out in a beaker equipped with a magnetic stirrer and a heating plate. Rhodamine B (RhB) was selected as a model contaminant. An initial concentration was established and a 500 $cm^3$ reaction solution comprising RhB and potassium peroxymonosulfate (PMS, $2KHSO_5 \cdot KHSO_4 \cdot K_2SO_4$, Sigma-Aldrich) was produced using ultrapure water. Since PMS is an acidic oxidizing agent, the pH decreased significantly upon addition of PMS. The experiment was carried out under acidic medium conditions (pH 3.28). To study the effect of solution pH on a RhB decomposition rate, PMS was added to the solution and then the pH of the solution was adjusted using $H_2SO_4$ (1M) and NaOH (1M). The reaction solution was magnetically stirred at a rotational speed of 500 rpm at temperatures of 10, 20, 30, 40 and 50° C.

The hollow activated carbon nanofibers of the present invention, $Co_xMn_{3-x}O_4$—HACNF (x=0 to 3), and the comparative materials were placed in a solution and the degree of activation of PMS was measured.

The reaction was allowed to proceed with different elapsed times (up to 80 minutes) and each water sample (1 mL) was recovered at predetermined time intervals and immediately filtered with a 0.2 μm cellulose acetate membrane filter to remove the solid catalyst. A 1 M sodium thiosulfate solution as a quenching agent was then immediately added to a 1 ml sample to quench the remaining sulfate radicals. The concentration of residual organic dye (RhB) was determined by monitoring the reduction in absorbance at the maximum adsorption wavelength by UV-vis spectroscopy. The concentration of Co and Mn ions leached into the solution was measured by inductively coupled plasma-mass spectrometry (ICP-MS, NexION300, PerkinElmer). To determine the active species, tert-butyl alcohol (TBA) and methanol (MeOH) were used to distinguish the hydroxyl radical ($HO^-$) from the sulfate ($SO_4^-$) radical. Quenching experiments were carried out by adding a quenching agent to the reaction solution before adding the PMS. For recycling experiments, the catalyst was collected after completion of the reaction, washed, dried, and then a fresh aqueous RhB/PMS solution was added to start the next reaction. Experiments were carried out at 25° C. with the same conditions of RhB (50 μM), PMS (1 mM) and catalyst (0.02 g/L). All experiments were repeated three times and then the average of the measurements was determined. The standard deviation of the three measurements was found to be less than 3%.

2-2: Experimental Results

Figure 4:
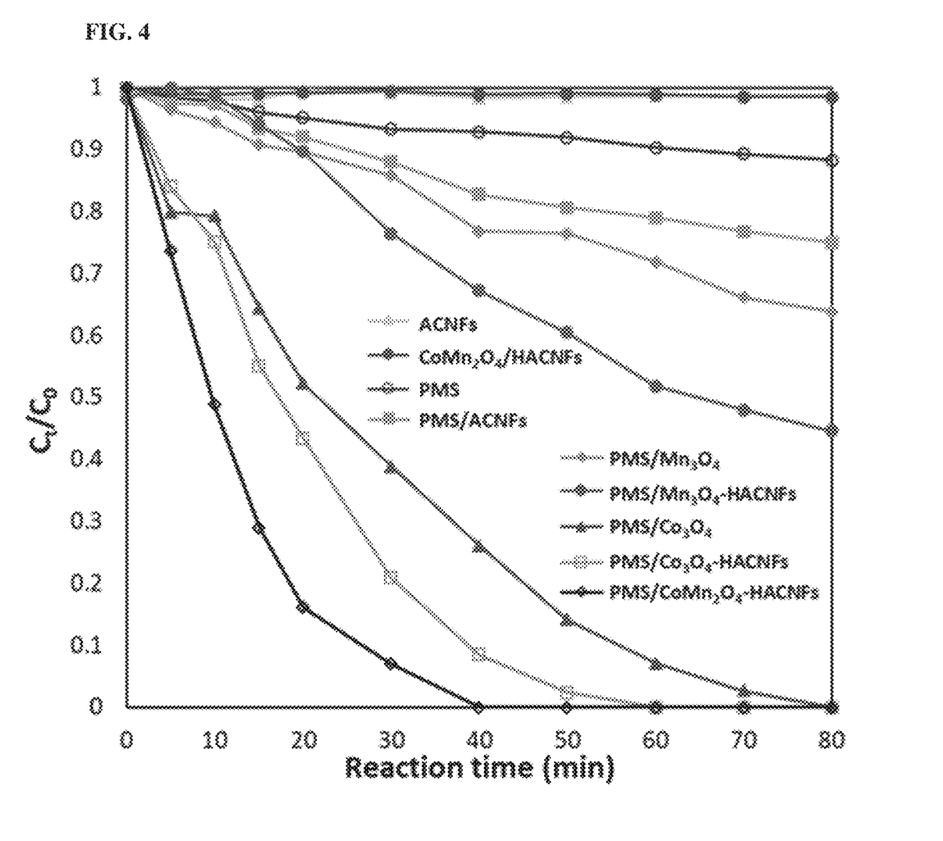
FIG. 4 compares the PMS activation performance of each test sample according to the reaction time.
Figure 5:
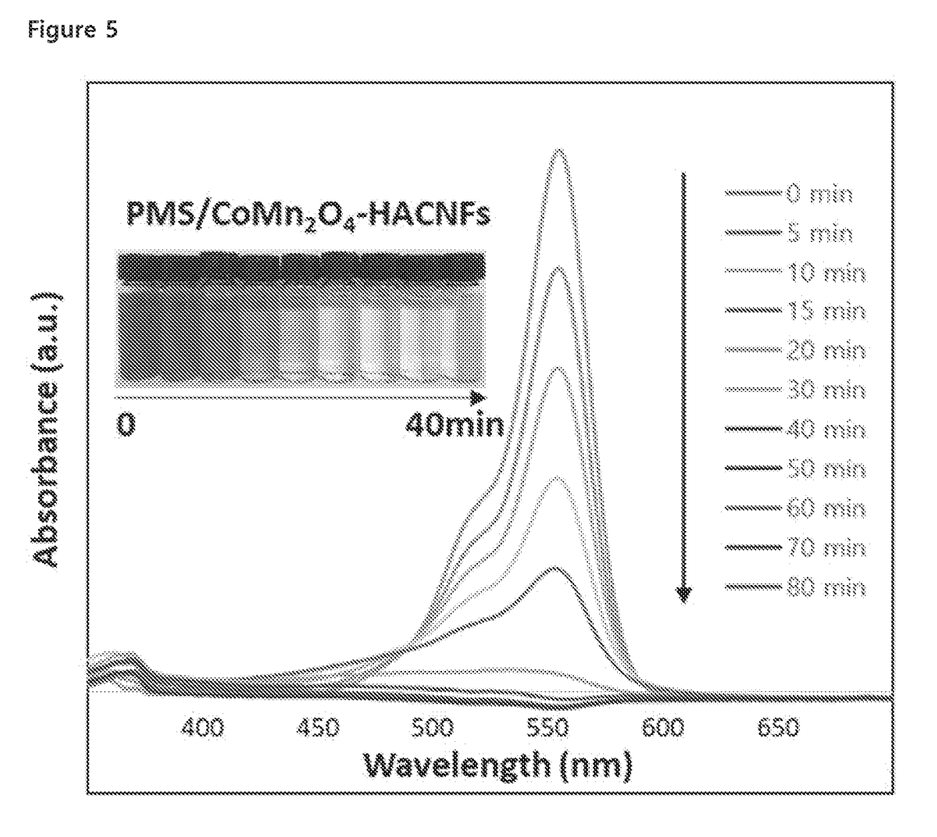
FIG. 5 shows the UV-vis spectral change using hollow activated carbon nanofibers and PMS according to the present invention (PMS/Co$_x$Mn$_{3-x}$O$_4$/HACNF) to determine the degree of reduction of RhB.

FIG. 4 compares the performance of PMS activation of each test sample according to the reaction time. FIG. 5 shows the UV-vis spectral change using hollow activated carbon nanofibers and PMS according to the present invention ((PMS/CoxMn3-xO4-HACNF) to measure the degree of reduction of RhB. The reaction conditions are [RhB]=50 μM, [measuring material]=0.02 g/L, T=25° C., [PMS]=1 mM, initial pH 3.28.

As shown in FIG. 4, when only activated carbon nanofibers (ACNF) and the $CoMn_2O_4$-HACNF according to the present invention were present in solutions without PMS, respectively, the RhB removal efficiency appeared to be significantly low. Both the case of ACNF and $CoMn_2O_4$-HACNF were found to exhibit a removal rate of less than 2% for RhB even during 80 minutes.

When PMS alone was used as the RhB remover, the RhB removal efficiency was found to be about 12% after 80 minutes. When PMS and ACNF were added simultaneously (PMS/ACNF), the RhB removal rate was found to increase to 25%. When $Mn_3O_4$—HACNF is compared with $Mn_3O_4$, it can be confirmed that after 80 minutes, the RhB removal rate of $Mn_3O_4$—HACNF is 55% and the removal rate of $Mn_3O_4$ is 36%, respectively, and that $Mn_3O_4$—HACNF promotes the activity of PMS more than $Mn_3O_4$, thereby improving the RhB removal rate. Similarly, when PMS/$Co_3O_4$-HACNF and PMS/$Co_3O_4$ were compared and tested, it was found that PMS/$Co_3O_4$-HACNF exhibited a RhB removal rate of 100% within 60 minutes from the start of the reaction, whereas PMS/$Co_3O_4$ exhibited a RhB removal ratio of 100% after 80 minutes. When $CoMn_2O_4$-HACNF is used together with PMS, it was shown that RhB is completely removed within 40 minutes from the start of the reaction.

Therefore, it can be confirmed that when $Co_xMn_{3-x}O_4$-HACNF (x=0 to 3) according to the present invention is used together with PMS, PMS can be activated to improve the removal rate of contaminants such as RhB.

In general, the decomposition of RhB is in accordance with pseudo-first order kinetics, and therefore the kinetic constants for the various catalysts can be calculated by the following Formula 1.

$$\ln\left(\frac{C_t}{C_g}\right) = -kt \quad \text{[Formula 1]}$$

where $C_t$ and $C_0$ are the concentration at the reaction time t and the initial concentration of RhB, respectively, and k is the kinetic rate constant.

As a result of calculation according to the above Formula 1, the kinetic rate constant of $CoMn_2O_4$—HACNF was 0.093 min⁻1, which was at least 45 times higher than the kinetic rate constant of 0.002 min⁻1 in the case of using only PMS. Among $CCo_xMn_{3-x}O_4$-HACNF when used with PMS, $CoMn_2O_4$-HACNF, which exhibits a kinetic rate constant of 0.093 min⁻1, was found to have the best RhB removal performance.

Figure 6:
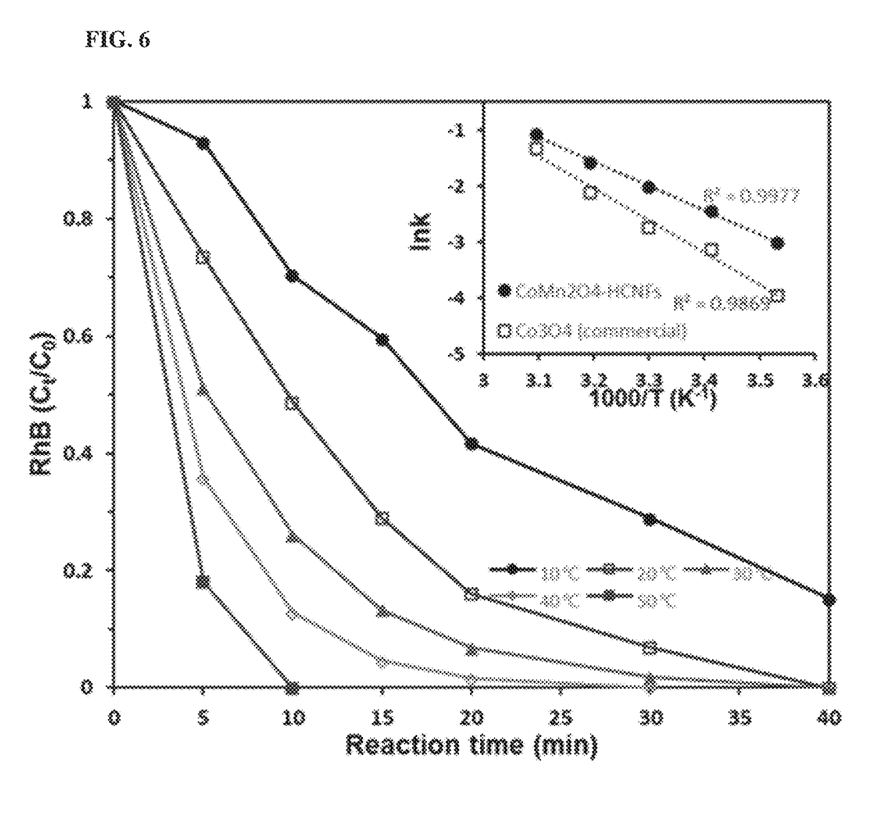
FIG. 6 shows the result of measuring the RhB decomposition rate according to temperature.

The effect of temperature on RhB decomposition was investigated and the results are shown in FIG. 6. Test conditions are as follows: [RhB]=50 μM, [$CoMn_2O_4$—HACNF]=0.02 g/L, [PMS]=1 mM, pH 3.28.

As shown in FIG. 6, when $CoMn_2O_4$-HACNF and PMS were used, RhB decomposition was shown to increase with increasing temperature. It was found that approximately 100% of RhB was removed within 40 minutes at 20° C., and the removal of RhB was completed within 10 minutes at 50° C. It is believed that this is because $SO_4$ and HO⁻ radicals were formed by thermal activation of PMS in a thermally enhanced aqueous solution, as in Reaction Scheme 1.

[Reaction Scheme 1]

$$HSO_5^- \xrightarrow{\text{heat}} SO_4^{*-} + HO^*$$

Meanwhile, the kinetic rate constant k value increased from 0.0871 min⁻¹ to 0.3406 min⁻¹. The activation energy of RhB decomposition can be calculated using the Arrhenius equation of Formula 2, which represents the correlation between the kinetic rate constant and temperature.

$$\ln k = \ln d + \left(\frac{-E_0}{RT}\right) \quad \text{[Formula 2]}$$

where A is a constant, E is the activation energy upon RhB decomposition and R is the gas constant (8.314 J mol⁻¹K⁻¹). The $E_a$ of $CoMn_2O_4$—HACNF was found to be 36.06 kJmol⁻¹ when plotting In k and 1/T using the data shown in FIG. 6 and.

Experiments were conducted to study the effects of temperature on RhB decomposition in PMS/$Co_3O_4$. As a result calculated using the relationship of k and 1/T, the Ea of $CO_3O_4$ was 47.71 kJmol⁻¹, which is much higher than that of $CoMn_2O_4$-HACNF. Comparison of this activation energy reveals that $CoMn_2O_4$—HACNF activates PMS significantly more than pure $CO_3O_4$.

Figure 7:
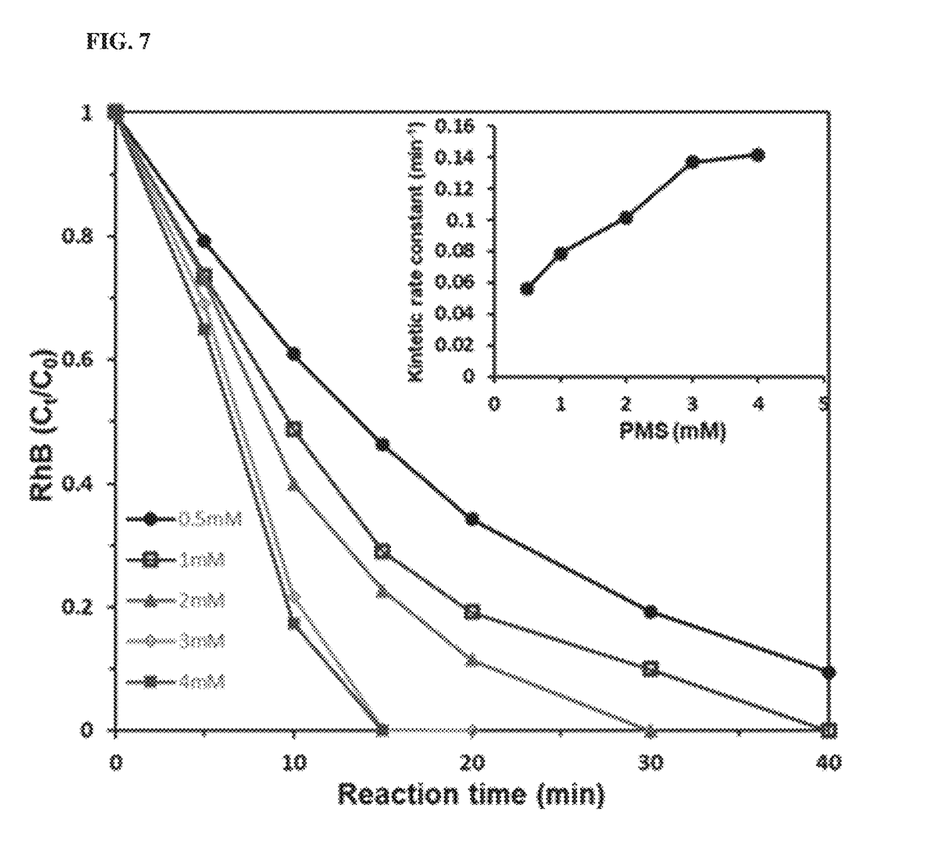
FIG. 7 shows the result of measuring the RhB decomposition rate according to increasing concentration of PMS.

In order to confirm the correlation between the PMS concentration and the decomposition rate of RhB, experiments were carried out by varying the PMS concentration. The experimental conditions are as follows: [RhB]=50 μM, [$CoMn_2O_4$-HACNF]=0.02 g/L, T=25° C., pH 3.28.

As a result, as shown in FIG. 7, it can be confirmed that the RhB decomposition rate clearly increases as the concentration of PMS increases. It can be confirmed that RhB was slowly decomposed at 0.5 mM PMS, but when the PMS concentration was increased to 3 mM, the k value increased from 0.0562 min⁻¹ to 0.137 min-. This result is because the generation of oxidizing radicals is accelerated as the concentration of PMS increases. However, when the PMS concentration was higher than 4 mM, the decomposition rate did not increase significantly.

Figure 8:
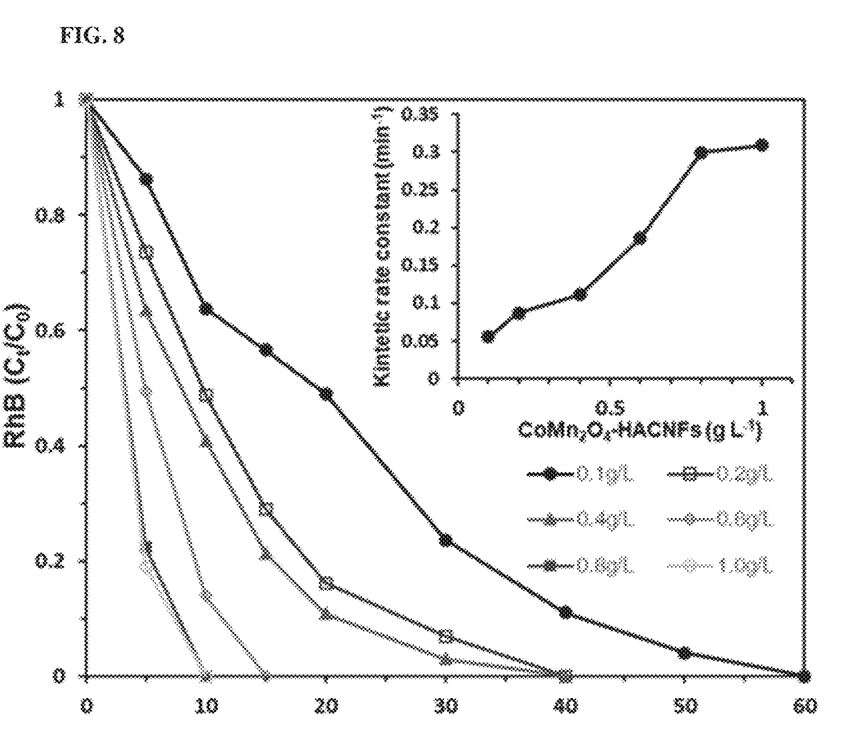
FIG. 8 shows the result of measuring the decomposition rate of RhB according to the concentration of CoMn$_2$O$_4$—HACNF.

FIG. 8 shows the decomposition rate of RhB according to the concentration of $CoMn_2O_4$-HACNF. The RhB decomposition rate according to the concentration of $CoMn_2O_4$-HACNF appeared similar to the decomposition rate according to the PMS concentration. When the concentration of $CoMn_2O_4$-HACNF is 0.01 and 0.08 g/L, RhB was shown to be completely removed within 60 and 10 minutes, respectively. The kinetic rate constant was shown to increase about 5.4 times as the concentration of $CoMn_2O_4$-HACNF increased from 0.01 to 0.08 g/L. It was found that the RhB decomposition rate no longer increased after the concentration of $CoMn_2O_4$-HACNF exceeded 0.08 g/L.

Figure 9:
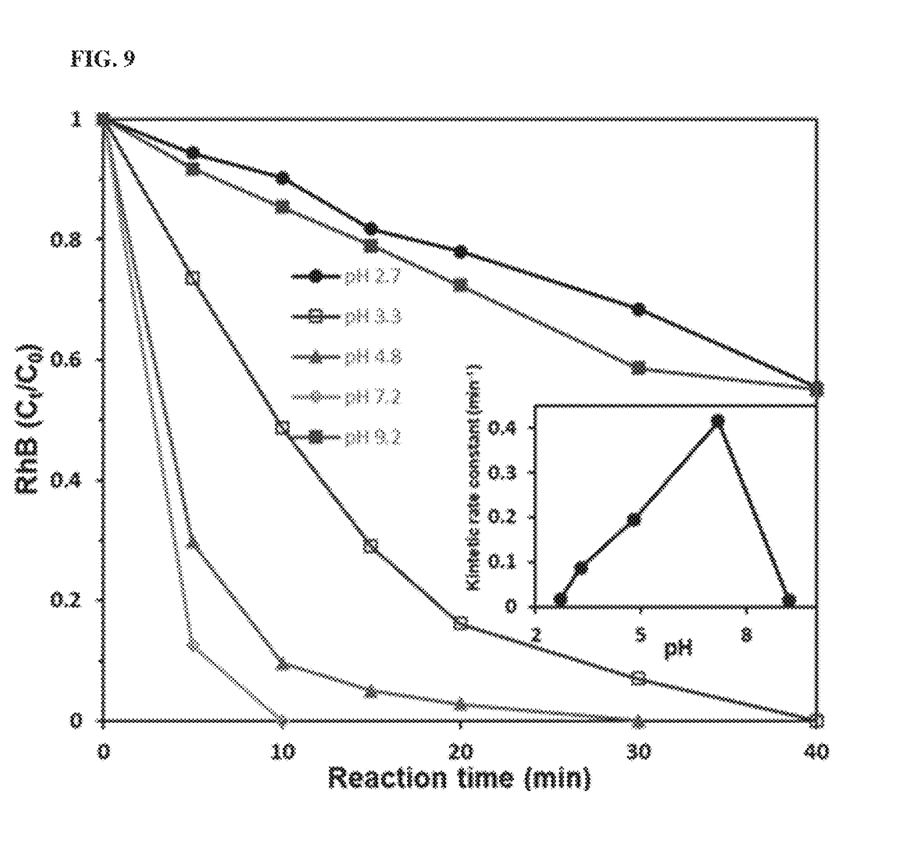
FIG. 9 shows the result of measuring the decomposition rate of RhB according to initial pH of the solution.

The effect of the initial solution pH on RhB decomposition was tested using five different pH values, pH 2.7, 3.3, 4.8, 7.2 and 9.2. Experiments were carried out by adjusting only the initial pH value without adjusting the pH during the reaction. The experimental conditions are as follows: [RhB]=50 μM, [catalyst]=0.02 g/L, T=25° C., [PMS]=1 mM.

As shown in FIG. 9, when the initial pH value was pH 2.7, the decomposition rate was shown to be the slowest, and it was shown to be the fastest at pH 7.2. It was found that when the pH is higher than 7.2, the decomposition rate decreases again. It was observed that the decomposition rate decreases rapidly as acidity increases.

It will be apparent to those skilled in the art that the present invention described above is not limited to the above-described embodiments and the attached drawings, and various substitutions, modifications, and alterations can be made without departing from the technical spirit of the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A catalyst for purifying water, comprising:
   hollow activated carbon nanofibers for activating peroxymonosulfate, wherein the hollow activated carbon nanofibers comprise a carbon material body formed into a tubular shape in which a hollow is formed on the inside of the hollow activated carbon nanofibers, and a plurality of fine pores are formed in the body of the hollow activated carbon nanofibers, $Co_xMn_{3-x}O_4$ is distributed in at least one of the hollow and the fine pores, and x in $Co_xMn_{3-x}O_4$ is 1 or 2, and
   peroxymonosulfate,
   wherein activation of peroxymonosulfate by the hollow activated carbon nanofibers generates sulfate radicals ($SO_4^-$) and hydroxyl radicals ($OH^-$).

2. The catalyst according to claim 1, wherein the hollow activated carbon nanofibers for activating peroxymonosulfate are produced by:
   electrospinning two different materials in a concentric cross-section such that a material comprising at least one of manganese acetate and cobalt acetate and polymethyl methacrylate (PMMA) is disposed on the inside and a material comprising peroxyacetyl nitrate (PAN) is disposed on the outside;
   performing a first thermal treatment on the structure formed by the electrospinning until a first predetermined temperature in an air atmosphere;
   performing a second thermal treatment on the first thermally treated structure until a second predetermined temperature in a nitrogen atmosphere; and
   activating the second thermally treated structure by applying a predetermined gas or water vapor.

3. The catalyst according to claim 1, wherein x is 2.

4. The catalyst according to claim 1, wherein the peroxymonosulfate is $2KHSO_5 \cdot KHSO \cdot K_2SO_4$.

5. A method for purifying contaminated water, comprising adding the catalyst for water purification according to claim 1 to contaminated water.

* * * * *